(12) United States Patent
Silva et al.

(10) Patent No.: US 8,089,286 B2
(45) Date of Patent: Jan. 3, 2012

(54) SYSTEM AND METHOD FOR QUANTUM COMPUTER CALIBRATION AND PERFORMANCE ESTIMATION

(75) Inventors: Marcus Silva, Waterloo (CA); Martin Roetteler, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 825 days.

(21) Appl. No.: 12/182,378

(22) Filed: Jul. 30, 2008

(65) Prior Publication Data

US 2009/0259905 A1    Oct. 15, 2009

Related U.S. Application Data

(60) Provisional application No. 61/045,033, filed on Apr. 15, 2008.

(51) Int. Cl.
  *G01R 35/00* (2006.01)
  *G01R 29/26* (2006.01)
(52) U.S. Cl. .......................... 324/601; 324/613
(58) Field of Classification Search .................. 324/601, 324/613
  See application file for complete search history.

(56) References Cited

U.S. PATENT DOCUMENTS

| | | | |
|---|---|---|---|
| 5,917,322 A | 6/1999 | Gershenfeld et al. | |
| 6,563,311 B2 | 5/2003 | Zagoskin | |
| 7,184,555 B2 | 2/2007 | Whaley et al. | |
| 2003/0121028 A1* | 6/2003 | Coury et al. | 717/138 |
| 2004/0000666 A1 | 1/2004 | Lidar et al. | |
| 2005/0062072 A1 | 3/2005 | Yamamoto et al. | |

OTHER PUBLICATIONS

Emerson et al.; Symmetrised Characterisation of Noisy Quantum Processes; Science vol. 317; preprint arXiv:0707.0685v1; 2007; 12 pages.
Emerson et al.; Pseudo-Random Unitary Operators for Quantum Information Processing; Science vol. 302; www.sciencemag.org; Dec. 19, 2003; pp. 2098-2100.
Duan et al.; Optimal Quantum Codes for Preventing Collective Amplitude Damping; The American Physical Society; vol. 58, No. 5; Nov. 1998; pp. 3491-3495.
Niskanen et al.; Quantum Coherent Tunable Coupling of Superconducting Qubits; Science, vol. 316; May 4, 2007; pp. 723-726.
Ojanen et al.; Global Relaxation of Superconducting Qubits; The American Physical Society; 2007; pp. 100505-1-100505-4.

* cited by examiner

*Primary Examiner* — Amy He
(74) *Attorney, Agent, or Firm* — James Bitetto; Joseph Kolodka (57) ABSTRACT

A system and method for characterizing noise in a quantum system includes determining pulse sequences for unitary twirling operations. Twirling processes are applied to a quantum system to calibrate errors and to determine channel parameters. Noise characteristics are determined from calibration data collected to calibrate the errors and to determine the channel parameters. The noise characteristics are characterized to determine if the noise is independent relaxation of qubits or collective relaxation of qubits.

21 Claims, 7 Drawing Sheets

SYSTEM AND METHOD FOR QUANTUM COMPUTER CALIBRATION AND PERFORMANCE ESTIMATION

RELATED APPLICATION INFORMATION

This application claims priority to provisional application Ser. No. 61/045,033 filed on Apr. 15, 2008, incorporated herein by reference.

BACKGROUND

1. Technical Field

The present invention relates to quantum computing and more particularly to systems and methods for calibrating and estimating performance of quantum computers.

2. Description of the Related Art

Building a quantum computer is a difficult task. Currently, one of the main problems faced by an experimenter in a laboratory is to verify that the device constructed performs as desired and is not hampered by factors such as environmental noise, cross-talk to other parts of a chip, low fidelity of a read-out mechanism, etc. While this task is currently in its infancy, it is expected that verification and testing of the parts comprising a quantum computer will be an important task for all future generations of such devices.

One type of noise that can affect the quantum computer is called energy relaxation, or simply relaxation. In current implementations based on superconducting flux qubits, this type of noise is the limiting factor of the life-time of the qubits. Understanding, characterizing, measuring, and eventually preventing it is an important goal on the way to a large scale quantum computer.

T. Ojanen, A. Niskanen, A. Abdumalikov, in "Global Relaxation Of Superconducting Qubits", Phys. Rev. B, vol. 76, p. 100505(R), 2007, propose a method to determine whether relaxation is correlated or not. It has been proposed by Ojanen et al. to characterize such noise using a new experimental setup that will require sophisticated quantum operations to be applied to the qubits.

Ojanen et al. consider a particular entangling operation (i.e., a composite operation of 2 qubits) to perform a test for correlated or uncorrelated noise. However, such composite operations of 2 or more qubits can be difficult to apply. The methods described in Ojanen et al. have not been demonstrated in an experiment as they rely on architectures of superconducting qubit systems that are not available currently, however, it is expected that they will be available in the near future. The main limitation of Ojanen et al. is that the generation of highly entangled quantum states are needed, a difficult task that cannot be achieved with high reliability using current superconducting qubit technology and remains challenging even when making optimistic assumptions about how technology will improve.

In nuclear magnetic resonance (NMR) systems, methods have been experimentally demonstrated that permit determining some properties of quantum channels. For example, the problem of determining the average fidelity of a quantum channel has been considered. Intuitively, this is the problem of determining how much a quantum channel distorts a given input state when this state is compared to the output of the channel. The methods used for the solution also used twirling of the channels. However, these methods do not provide the type of noise characterization that is needed for many practical applications.

SUMMARY

A system and method for characterizing noise in a quantum system includes determining pulse sequences for unitary twirling operations. Twirling processes are applied to a quantum system to calibrate errors and to determine channel parameters. Noise characteristics are determined from calibration data collected to calibrate the errors and to determine the channel parameters. The noise characteristics are characterized to determine if the noise is independent relaxation of qubits or collective relaxation of qubits.

A system for characterizing noise in a quantum system includes an error calibration module configured to apply twirling processes to a quantum system to calibrate errors in pulse sequences input to the twirling operations. A channel parameter calibration module is configured to apply twirling processes to a quantum system to determine channel parameters in pulse sequences input to the twirling operations. A noise characterization module is configured to receive the errors and the channel parameters from the error calibration module and the channel parameter calibration module to characterize the noise characteristics to determine if the noise is independent relaxation of qubits or collective relaxation of qubits.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a system and method to perform a characterization for correlated or uncorrelated noise with a much simpler experimental setup that is closer to currently available hardware. Possible uses for performance estimation and calibration once the quantum computer increases in size are also provided.

One technical problem addressed by the present principles is that of determining the type and strength of a particular type of noise that can affect a quantum computer. This noise is called energy relaxation. The present embodiments deal with the problem of efficiently estimating properties of noise operations that affect a quantum computer. Mathematically, a noise operation is modeled by the concept of a "super-operator" which is a matrix of exponential size in the number of qubits. In general, exponentially many parameters are necessary to give a complete description of the noise.

In accordance with the present disclosure, a subset of these parameters is focused on, namely a linear number of parameters. These parameters can be efficiently determined from statistics of very few experiments. Furthermore, we show that from these few parameters relevant questions regarding the performance of the quantum computer can be determined. A simple quantum protocol can be implemented on an optimal point setup with tunable couplings. This protocol permits information about gate fidelities and properties of decoherence to be obtained in superconducting systems.

Preferred embodiments may include robust estimation of average gate fidelity of two-qubit unitary operations, which may be implemented, for example, using the system described in A. O. Niskanen, K. Harrabi, F. Yoshihara, Y. Nakamura, S. Lloyd, and J. S. Tsai, *Quantum coherent tunable couplings of superconducting qubits*, Science, vol. 316, pp. 723-726, 2007, incorporated herein by reference in its entirety (hereinafter Niskanen et al), and provide a method alternative to Ojanen et al. to test for correlated relaxation processes. The advantages of the present methods include that in addition to the operation we want to characterize (e.g., two-qubit gate fidelity, relaxation), it only needs the implementation of local operations. Local operations are much easier to implement than general quantum operations. More importantly, the present approach does not require the preparation of entanglement, or measurement in an entangled basis. The present approach is also compatible with the limitations posed by present measurement setups. The presented methods can be used to calibrate a quantum computer and to estimate its performance under realistic conditions of noise induced by relaxation.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
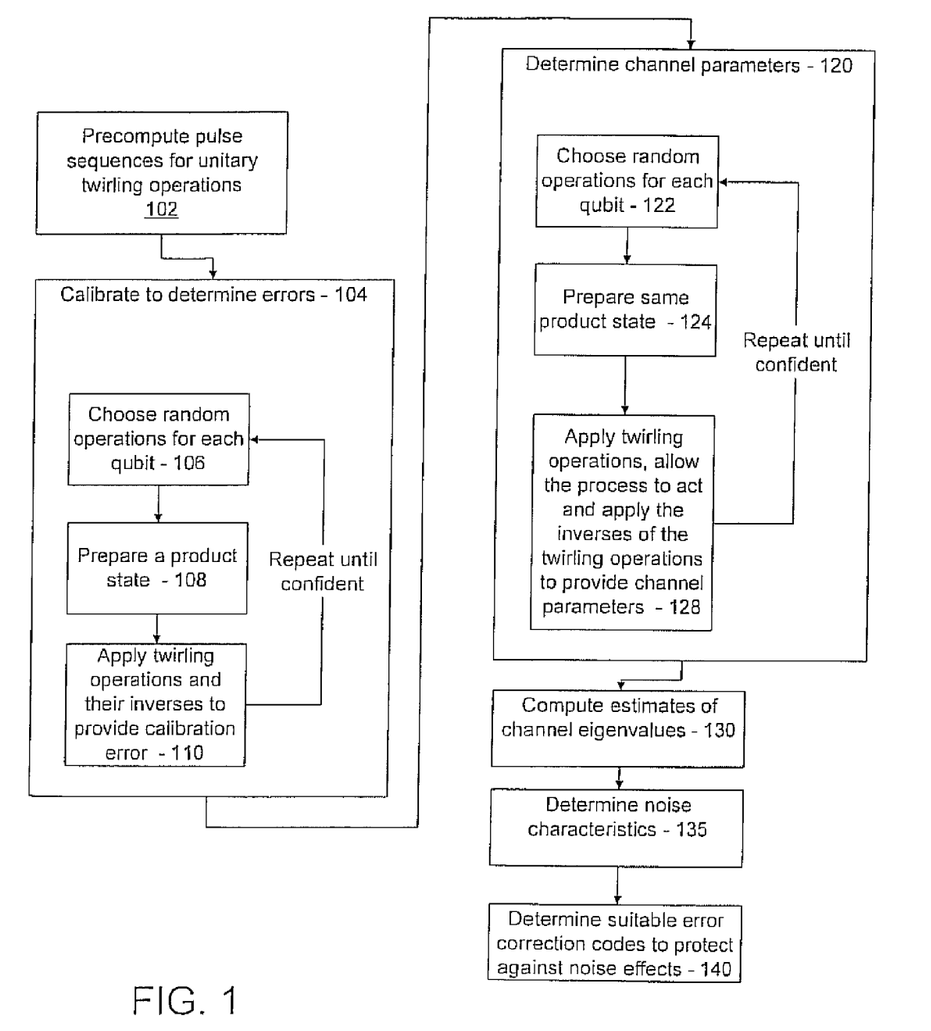
FIG. 1 is a block/flow diagram showing a system/method for characterizing noise for a quantum operation or system in accordance with one illustrative embodiment.

Referring now to the drawings in which like numerals represent the same or similar elements and initially to FIG. 1, a system/method is shown in accordance with one illustrative embodiment for characterizing quantum couplings. In block 102, precompute pulse sequences for a set S of n unitary twirling operations $S=\{U_1, \ldots, U_n\}$ (see e.g., Table 1 for a set of twirling operations). Unitary operations are basic gates that a quantum computer can carry out on given input data. This pre-computation step can be performed offline and involves optimization techniques such as pulse shaping. In case of a quantum computer based on superconducting qubits, such as the one described by a Hamiltonian (see below), this step 102 involves determining the microwave pulses that have to be applied to implement n operations needed for the method. For nuclear magnetic resonance qubits, this step 102 involves determining radio frequency pulses that have to be applied to implement the n operations. An example for a set of 12 unitary twirling operations that can be used are provided below in Table 1.

Figure 2:
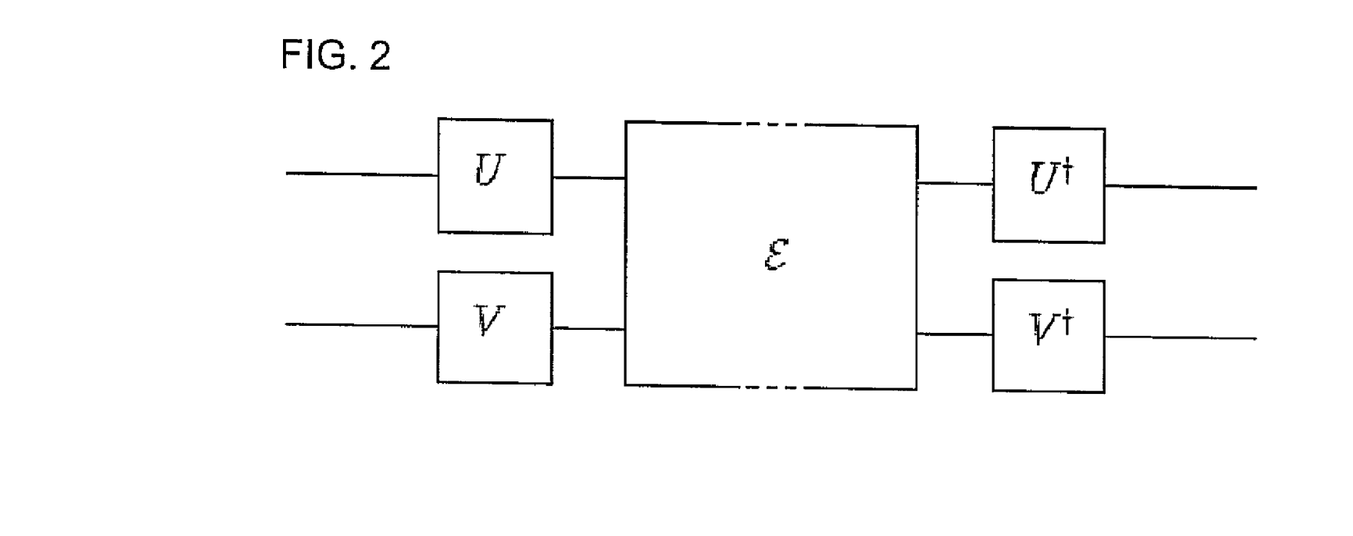
FIG. 2 shows a quantum circuit for noise estimation (channel parameters) for a two qubit system.

Twirling a quantum process $\epsilon$ (i.e., a completely positive trace preserving (CPTP) map) includes averaging $(U \otimes V)\epsilon(U \otimes V)^+$ over some distribution of unitaries, as depicted in FIG. 2. U and V are randomly selected unitaries. This yields what we call a twirled process $\bar{\epsilon}$, which can be described by much fewer parameters than $\epsilon$, while still yielding valuable information about $\epsilon$ itself.

Consider a simple quantum protocol which we call Clifford twirling. In Clifford twirling, a specific set of 12 local unitary operations is used which includes the identity and the 3 Pauli matrices. Ignoring unitaries for state preparation, the following set S of twelve unitaries are needed. Note that the unitaries are specified in terms of rotations around axes in a Bloch sphere.

TABLE 1

Figure 3:
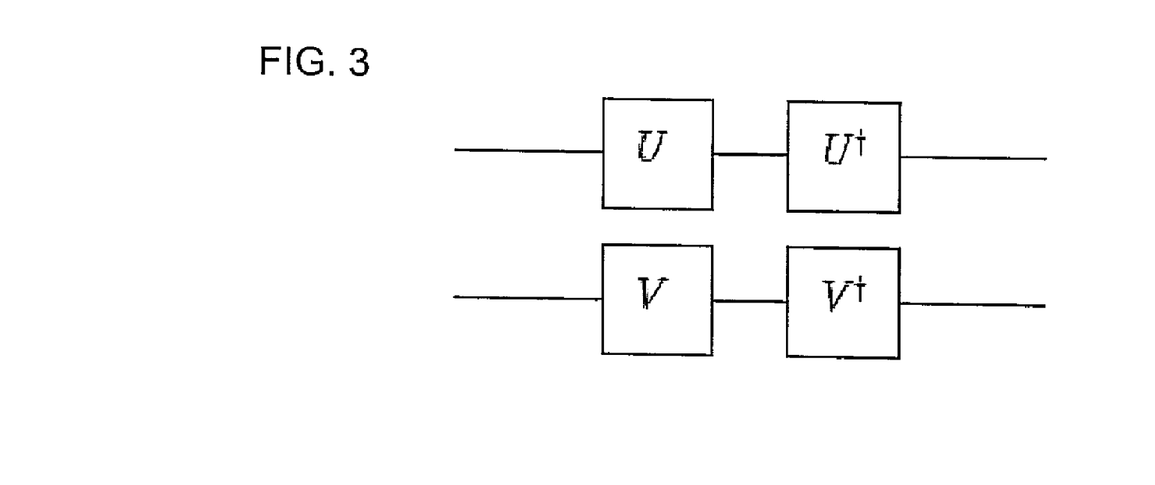
FIG. 3 shows a quantum circuit for error calibration for a two qubit system.

Unitaries for twirling operations (in radians):

$U_1 = 1$
$U_2 = X(\pi)$
$U_3 = Y(\pi)$
$U_4 = Z(\pi)$ $U_5 = X(\frac{\pi}{2})Y(\frac{\pi}{2})$ $U_6 = X(-\frac{\pi}{2})Y(\frac{\pi}{2})$ $U_7 = X(\frac{\pi}{2})Y(-\frac{\pi}{2})$ $U_8 = X(-\frac{\pi}{2})Y(-\frac{\pi}{2})$ $U_9 = Y(\frac{\pi}{2})X(\frac{\pi}{2})$ $U_{10} = Y(-\frac{\pi}{2})X(\frac{\pi}{2})$ $U_{11} = Y(\frac{\pi}{2})X(-\frac{\pi}{2})$ $U_{12} = Y(-\frac{\pi}{2})X(-\frac{\pi}{2})$ In Clifford twirling, a random $U_i$ operation is applied to each of the qubits independently. Its inverse is applied to the corresponding qubit after the process we want to characterize has acted. In FIG. 3, two random unitaries U and V are shown. For each experiment, a different random unitary is chosen for each qubit. The protocol (for 2 qubits) will be described below.

In block 104, a calibration step is performed. We determine parameters of the quantum computer in case an empty operation is performed. This involves the collection of measurement data from several independent runs over suitable preparation and measurement bases. The purpose of the calibration is to compensate for errors that occur in the preparation of the initial quantum state and during the final measurement. The calibration performed here is a special case of twirling which in turn is a general method to map quantum channels to simpler ones. Concretely, for a system of two qubits, calibration is done by the following procedure:

In block 106, choose two random operations independently from the set S, one for each qubit (each qubit may be referred to as a system). Call them $U_i$ and $U_j$. In block 108, prepare a product state which is close to an eigenstate of the measurement bases $Z_1$ and $Z_2$ (This is represented as $\sigma_z^{(1)}$ and $\sigma_z^{(2)}$. A measurement basis, such as $Z_1$ or $Z_2$, specifies an aspect about the quantum mechanical system that the experimentation tries to extract from the system. It is assumed in quantum computing that quantum mechanical systems that can be used to perform quantum information processing tasks have certain preferred measurement bases in which the systems can be measured, thereby generating classical information about the state of the systems from the measurement results. In the systems considered as preferred embodiments, these bases correspond to the Pauli spin operators $Z_1$, $Z_2$, etc. In block 110, apply $U_i$ and $U_j$. This means apply the twirling operations, then apply $U_i^+$ and $U_h^+$, which are the inverse operations of $U_i$ and $U_j$, respectively. Measure the qubits in the eigenbasis of $Z_1$ and $Z_2$ (or $\sigma_z^{(1)}$ and $\sigma_z^{(2)}$). This yields the calibration data. The circuit for this is shown in FIG. 3, where U and V are $U_i$ and $U_j$, respectively and $U^+$ and $V^+$ are inverse operation of U and V, respectively. In block 112, go back to block 106 and repeat K times (K depends on the desired confidence).

In block 120, noise process $\epsilon$ acting on the quantum computer memory is modeled as quantum channels. The effect $\epsilon$ has on the initial quantum state depends on the time it acts. We use the idea of twirling to determine some data about the quantum channel given by $\epsilon$.

In block 122, choose two random operations independently from the set S, one for each qubit. Call them $U_i$ and $U_j$. In block 124, prepare the same product state again as in block 108. In block 126, apply $U_i$ and $U_j$, allow the process $\epsilon$ to act on qibits 1 and 2, then apply $U_i^+$ and $U_j^+$ again, and measure in the eigenbasis of $Z_1$ and $Z_2$. This circuit is shown in FIG. 2. In block 128, go back to block 122, and repeat K times (K depends on the desired confidence).

To characterize this twirled process, we apply it to a fixed state, and measure in a fixed basis. The initial state is a state with non-zero expectation for $\sigma_z^{(1)}$ and $\sigma_z^{(2)}$ ($Z_1Z_2$). The measurement that needs to be done is a projective measurement into the z eigenbasis of each qubit.

Alternatively, it is enough to be able to estimate the populations of $|00\rangle, |01\rangle, |10\rangle, |11\rangle$. This can be done at the expense of four times the number of experiments if we can only distinguish between $|00\rangle$ and the rest. Three parameters are then estimated: the expectation value of $\sigma_z^{(1)}$ (or $Z_1$) and $\sigma_z^{(2)}$ (or $Z_2$) and the expectation value of both $\sigma_z^{(1)}$ and $\sigma_z^{(2)}$ (or $Z_{12}$). This can be done directly from the population estimates.

In block 130, the calibration data collected in block 104, and the data on the channel parameters from block 120 to compute estimates for channel eigenvalues are employed. For a system of two qubits, these eigenvalues are given by the formula $$c_{e1} = \frac{\langle \sigma_Z^{(1)} \rangle_{op}}{\langle \sigma_Z^{(1)} \rangle_{cal}}, c_{1e} = \frac{\langle \sigma_Z^{(2)} \rangle_{op}}{\langle \sigma_Z^{(2)} \rangle_{cal}}, \text{ and } c_{ee} = \frac{\langle \sigma_Z^{(1)} \sigma_Z^{(2)} \rangle_{op}}{\langle \sigma_Z^{(1)} \sigma_Z^{(2)} \rangle_{cal}}.$$

Indices "cal" refer to the calibration data collected in block 104 and "op" refers to operation data collected in block 120. The eigenvalues c are dimensionless quantities that describe how an input state (or alternatively in the dual picture: input observable) gets scaled when sent through the quantum channel.

Figure 4:
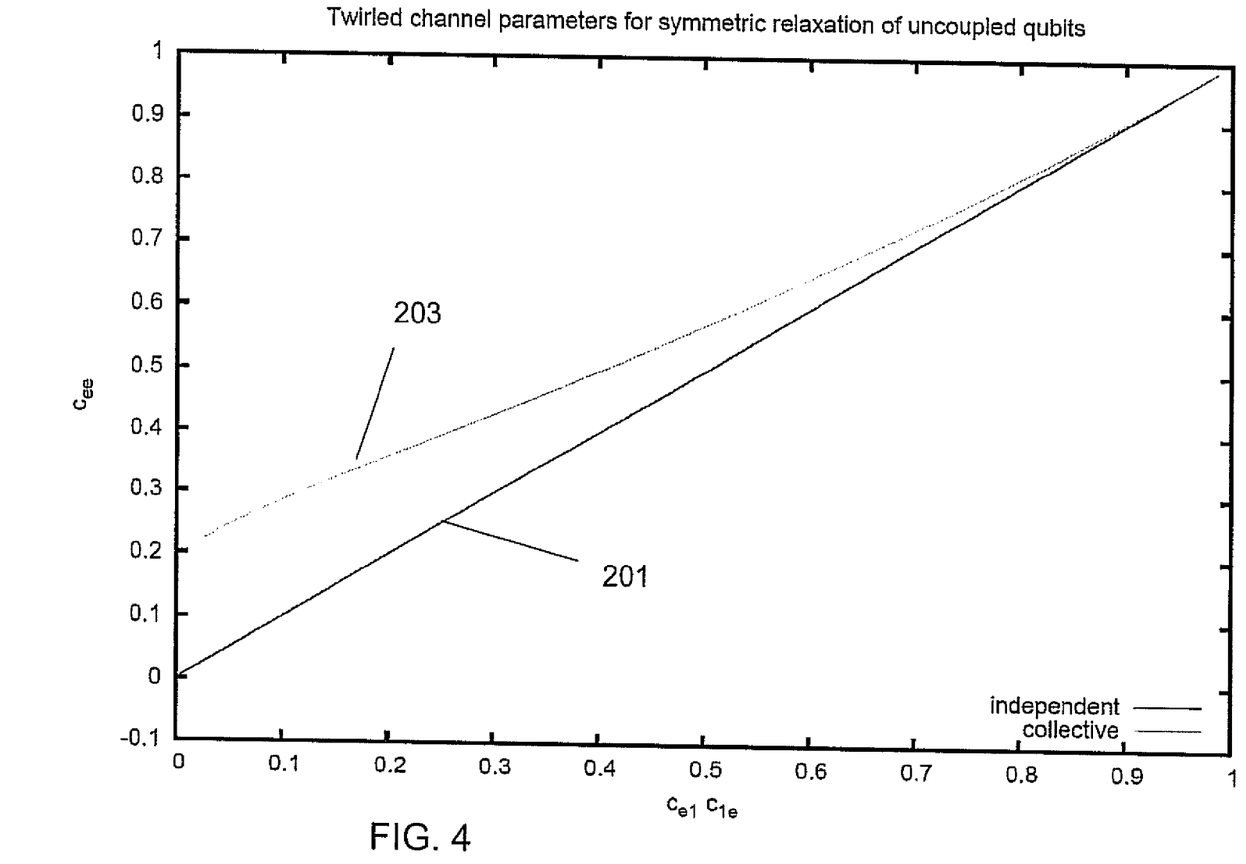
FIG. 4 is a plot showing a statistical test for noise estimation based on channel eigenvalues to distinguish between independent and correlated relaxation of a two qubit system.

These eigenvalues are related to the probabilities of having errors on the qubits. The four different events are given by a) no error (event "11"), b) error on the first qubit (event "e1"), c) error on the second qubit (event "1e"), and d) error on both qubits (event "ee"). The probabilities can be determined via the following simple linear equations, once the eigenvalues are known:

$Pr(\text{``ee''}) = (1+3c_{e1}+3c_{1e}+9c_{ee})/16$ $Pr(\text{``e1''}) = (1-3c_{e1}+9c_{1e}-9c_{ee})/16$ $Pr(\text{``1e''}) = (1+9c_{e1}-9c_{1e}-9c_{ee})/16$ $Pr(\text{``ee''}) = (1-9c_{e1}-9c_{1e}+9c_{ee})/16$ Now, in block 135, this data can be used to distinguish between the following two different types of noise that can therefore be used to obtain some important information about the type of decoherence effects that harm the quantum computer: a) collective relaxation of the qubits and b) independent relaxation of the qubits. Noting that in the case of independent relaxation the eigenvalues follow the rule $c_{ee}=c_{e1}c_{1e}$, the test to distinguish between a) and b) is to determine how much this rule is violated. There are several ways to visualize the independence condition and its possible violation. One such way is plotted in FIG. 4, where the data points corresponding to independent relaxation correspond to a line 201, whereas collective noise corresponding to a line 203 would give rise to data that reaches a different asymptotic limit for the two cubit errors when the single cubit errors are small.

Figure 5:
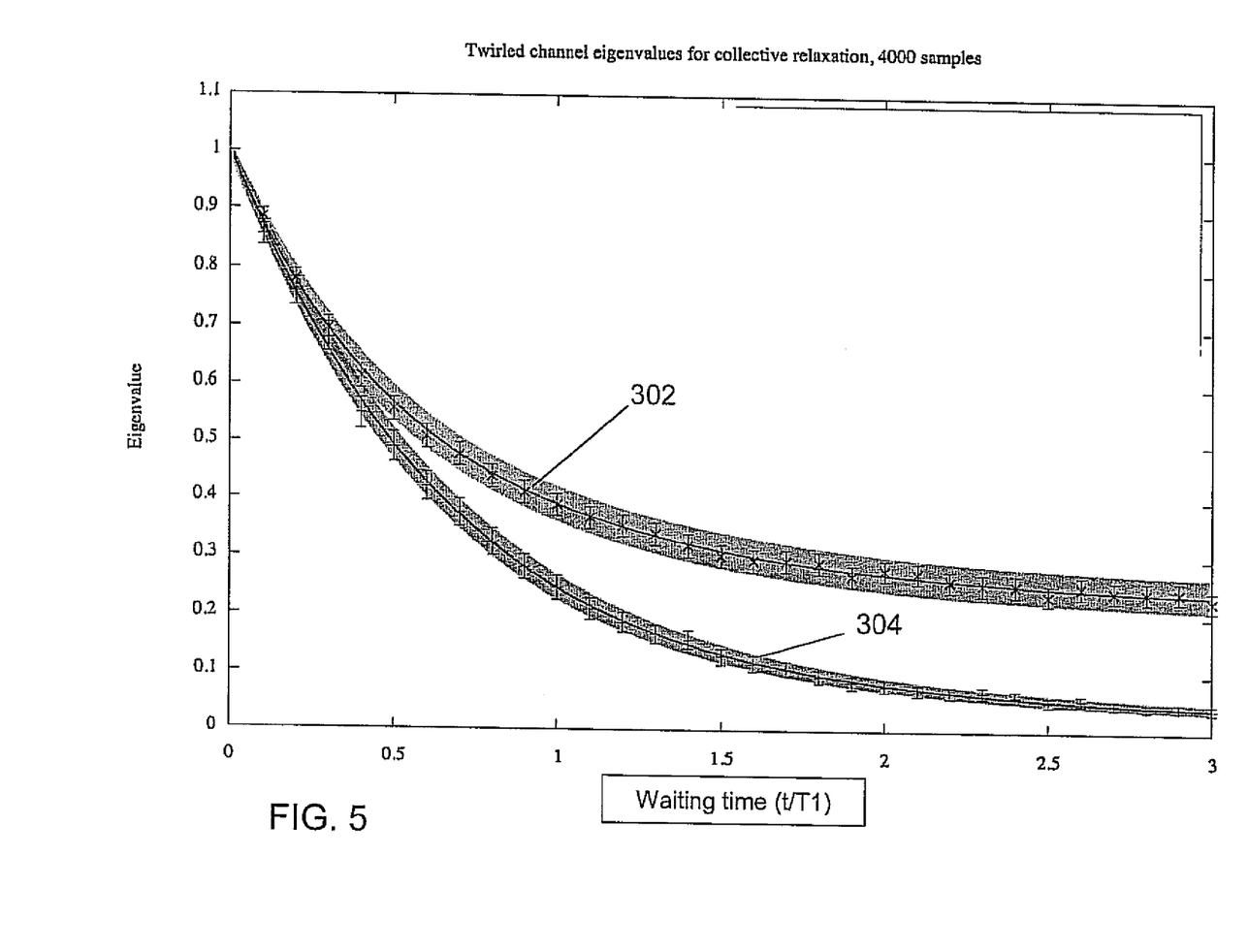
FIG. 5 is a plot showing a statistical test for noise estimation based on channel probabilities to distinguish between independent and correlated relaxation of a two qubit system.

Another way to visualize and also to test the independence condition is shown in FIG. 5 in which the dependence of the present method on waiting time can be seen. The experiment has to be done in a regime that is greater than the relaxation time $T_1$ (In the plot of FIG. 5, time is given as relative time $t/T_1$, e.g., $t/T_1=1$ corresponds to "1" on the x-axis). At values of time (t) around $2T_1$ a significant difference between the two cases (correlated weight 302, which represents collective relaxation and uncorrelated weight 304 which represents independent relaxation). In the correlated case there will be a significant portion of the initial state that gets projected onto the singlet state, which is a maximally entangled state on two qubits. This singlet state is maximally robust against collective relaxation since it is an invariant under the noise process. This fact is reflected by a non-zero asymptotic value of the eigenvalue as in block 302. In the uncorrelated case, there will be little or almost no projection of the initial state onto the maximally entangled state. In this case, the eigenvalue quickly goes to zero as all other states different from the singlet state will be annihilated by the noise process, leading to a zero asymptotic value as in block 304. This can be observed, yielding a test for independent versus correlated noise that is robust against imperfections in the gates used for preparation and measurement of the quantum states.

In block 140, after it has been determined whether the qubits are subject to independent relaxation or collective relaxation, this information can be used to find suitable quantum error-correcting codes that protect against the specific type of noise that affects the system. The determination of the quantum code may be performed using known techniques for fault tolerant quantum computation.

Blocks 104, 120 and 130 solve the problem of determining characteristic properties of noise that affects a quantum computer which are usually very hard to obtain. Knowledge of these properties reveals a lot about the performance of the quantum computer implementation at hand. Knowledge of the type of noise correlations that affect the quantum computer can be used in later steps to design specific error correction and fault-tolerance methods that are adapted to the type of noise correlations and that can be used to mitigate the negative effects of noise.

For example, block 104 is a method to calibrate away imperfections in the preparation of the initial state of the computation and inaccuracies in the final measurement. As these imperfections and inaccuracies are prevalent in all quantum computer implementations, we expect that at least this calibration step is useful in a broader context. Block 120 is a method to gather measurement data about the channel by performing a series of twirling experiments. This data is then analyzed by a statistical test which is the content of block 130.

Preferred embodiments include superconducting qubit systems. Other embodiments may include nuclear magnetic resonance qubit systems. The system and methods are applicable to any quantum computer system with respect to any concrete physical implementation.

Figure 6:
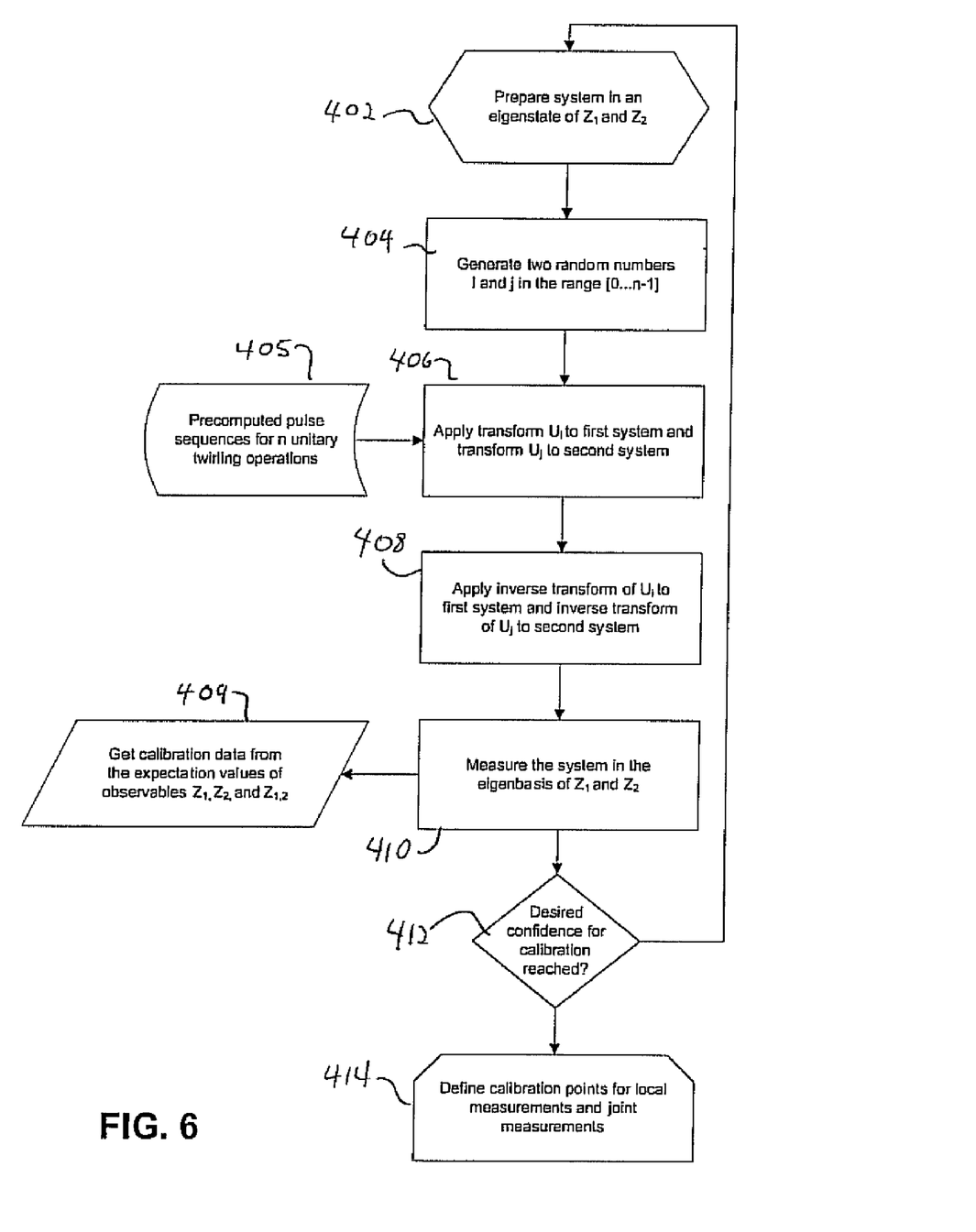
FIG. 6 is a block/flow diagram showing a system/method for noise estimation and determination of operation points for quantum computer gate elements.

Referring to FIG. 6, a block/flow diagram showing operations for calibration of errors in quantum computer memory that are due to gate imperfections. In block 402, the system to be evaluated is prepared in eigenstates of $Z_1$ and $Z_2$. In block 404, random numbers are generated to select precomputed pulse sequences from twirling operations for a set S of block 405. In block 406, transform $U_i$ is applied to the first system ($Z_1$) and $U_j$ is applied to the second system ($Z_2$). In block 408, apply inverse transforms of $U_i$ and $U_j$ to the first and second systems respectively.

In block, 410, measure the system eigenbasis of $Z_1$ and $Z_2$. In block 411, calibration data is retrieved from expectation values of observed $Z_1$, $Z_2$ and $Z_{12}$. In block 412, a determination is made as to whether the desired confidence for the calibration has been reached. If the confidence is met, the path goes to block 414 to define calibration points for local measurements and joint measurements of the quantum system. Otherwise, the path returns to block 402 and iterates until the desired confidence is achieved.

Figure 7:
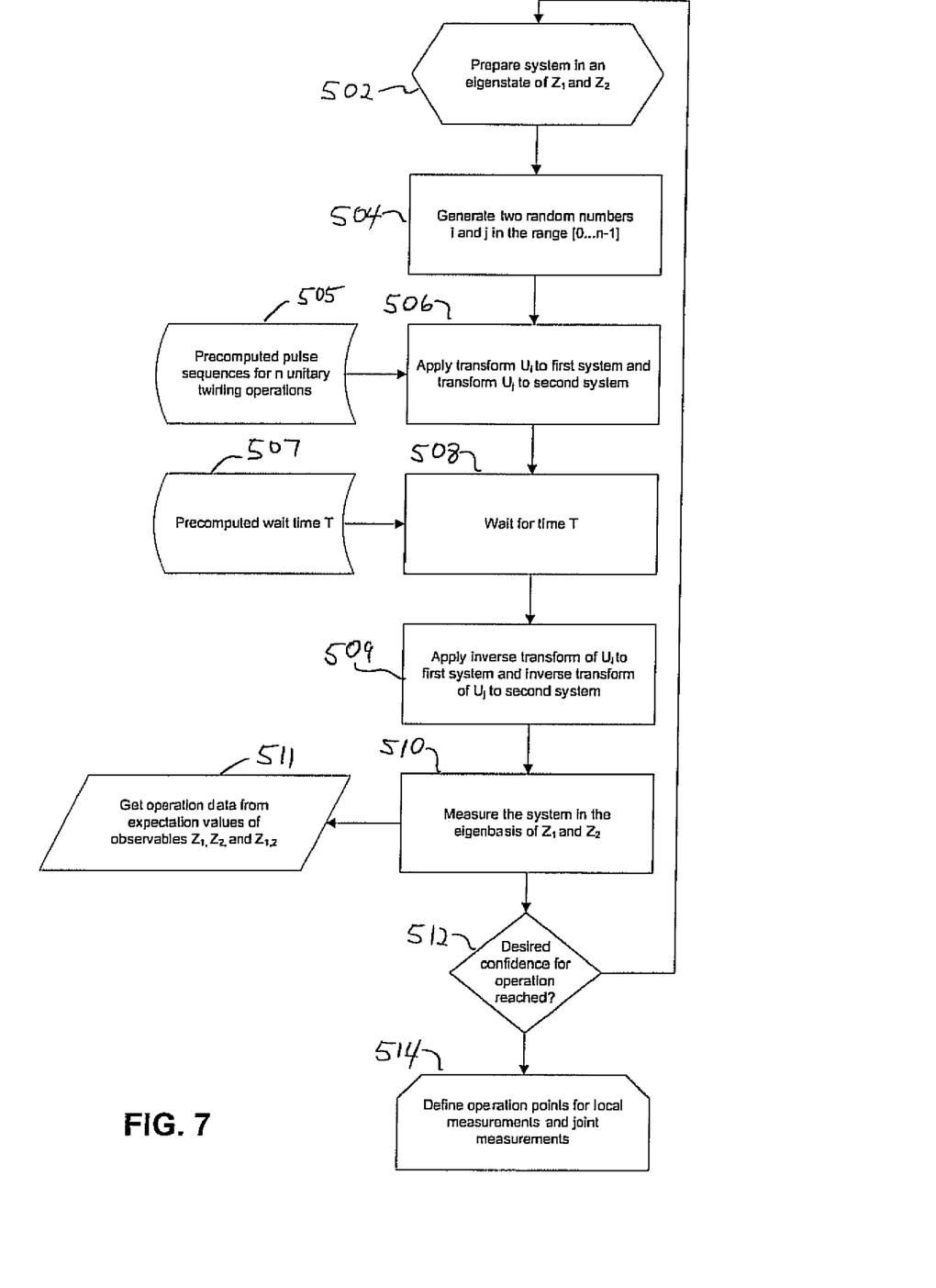
FIG. 7 a block/flow diagram showing a system/method for calibration of errors in quantum computer memory that are due to gate imperfections.

Referring to FIG. 7, another block/flow diagram for showing operations for noise estimation and determination of operation points for quantum computer gate elements. In block 502, the system to be evaluated is prepared in eigenstates of $Z_1$ and $Z_2$. In block 504, random numbers are generated to select precomputed pulse sequences from twirling operations for a set S of block 505. In block 506, transform $U_i$ is applied to the first system ($Z_1$) and $U_j$ is applied to the second system ($Z_2$). In block 507, a wait time T is precomputed. In block 508, the program waits for time T to elapse. In block 509, apply inverse transforms of $U_i$ and $U_j$ to the first and second systems, respectively.

In block, 510, measure the system eigenbasis of $Z_1$ and $Z_2$. In block 511, calibration data is retrieved from expectation values of observed $Z_1$, $Z_2$ and $Z_{12}$. In block 512, a determination is made as to whether the desired confidence for the calibration has been reached. If the confidence is met, the path goes to block 514 to define calibration points for local measurements and joint measurements of the quantum system. Otherwise, the path returns to block 502 and iterates until the desired confidence is achieved.

Superconducting qubits: In one practicable application, a concrete description of a two qubit system in form of a Hamiltonian is considered. A natural time evolution of the system (H) for a time $\Delta t$ is given by a unitary operator $e^{(-iH\Delta t)}$. The Hamilton describes the physical system and can be, e.g., of ZZ-type in the case of a liquid state NMR or, for the case of superconducting flux qubits, of the form:

$$H_{rot} = \sum_{j=1}^{2} \frac{\Omega_j}{2}(\cos\phi_j \sigma_x^j - \sin\phi_j \sigma_y^j) + \frac{\Omega_{12}}{4}(\sigma_x^1 \sigma_x^2 - \sigma_y^3 \sigma_y^4).$$

The above equation shows the Hamiltonian for the natural coupling between two superconducting flux qubits. Here, $\Omega_j$ is the resonant microwave-induced single qubit Rabi frequency of qubit j. A typical value of $\Omega_j$ for a superconducting flux qubit system, realized as an Al/AlO$_x$ low temperature superconducting circuit with Josephson Junctions, is between 4 and 7 GHz. Further, $\phi_j$ is the microwave phase, a real number between 0 and $2\pi$, and $\sigma_y^j$ and $\sigma_x^j$ are Pauli spin matrices. Controllable coupling between the qubits is achieved using the term $\Omega_{12}$ in the Hamiltonian which can be used to drive the sum-frequency transition. A typical frequency for the term $\Omega_{12}$ is between 20 and 25 MHz.

The time-scale on which the dynamical decoupling scheme is applied depends strongly on the particular type of physical embodiment of the quantum computer. An example of a quantum computer built on low-temperature superconducting quantum circuits (Josephson Junctions) has values of $T_2$ of the order of a few nanoseconds and $T_1$ of the order of a few hundred nanoseconds, in recent realizations even on the order of microseconds. Single qubit gates can be operated at frequencies between 4-6 GHz in a typical implementation and two-qubit gates at frequencies between 20-25 Mhz in the same typical implementation (as a low temperature Al/AlO$_x$ superconductor).

NMR qubits: In another possible embodiment, H is the system Hamiltonian of a molecule in a liquid state NMR quantum computer or a molecule in a solid state NMR quantum computer. In the embodiment of liquid state NMR only Hamiltonians H having ZZ interactions are possible. In the embodiment of solid state NMR, homonuclear and heteronuclear dipole-dipole interactions can occur. For liquid state NMR systems time-scales of decoherence time $T_2$ of the order 1-2 seconds and relaxation times $T_1$ of 10-100 seconds have been observed. In another embodiment, the disclosed method can be applied to superconducting flux qubits. Here, the decoherence and relaxation times are much shorter, but also the gate frequencies are much higher.

Figure 8:
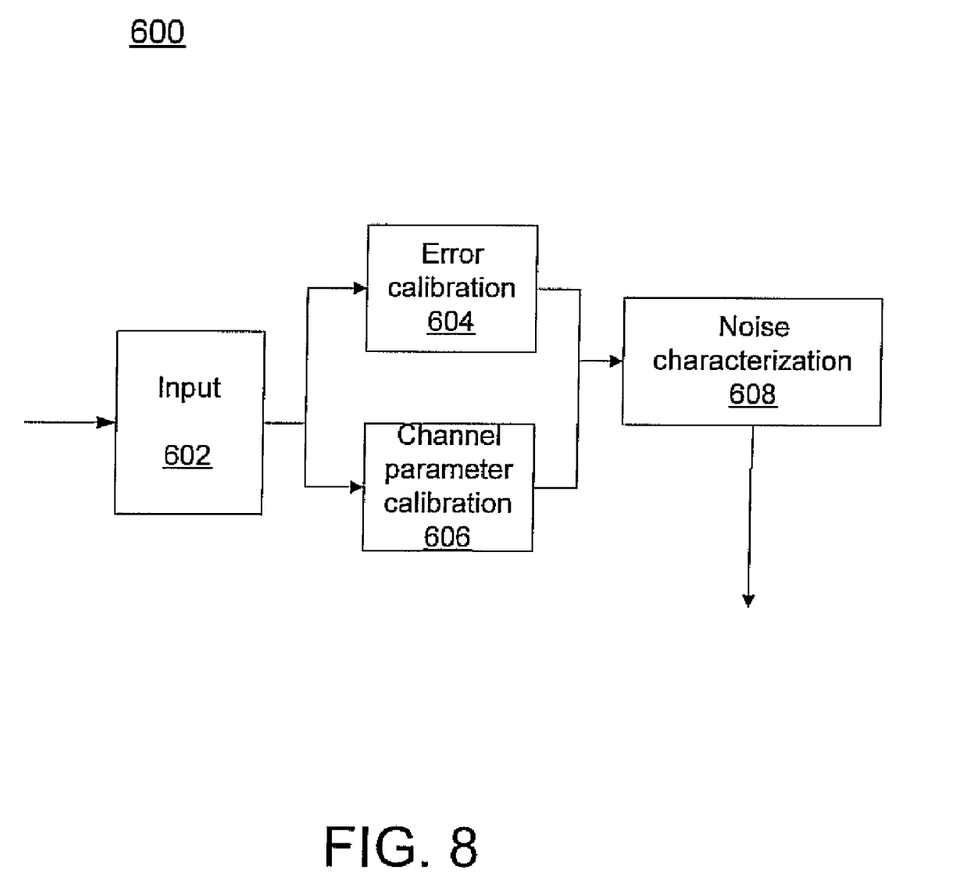
FIG. 8 is a block diagram showing a system for characterizing noise for a quantum operation or system in accordance with one illustrative embodiment.

Referring to FIG. 8, a system 600 for characterizing noise in a quantum system is illustratively shown. An input device 602 generates an input sequence signal to be characterized. An error calibration module 604 is configured to apply twirling processes to a quantum system to calibrate errors in pulse sequences input to the twirling operations. A channel parameter calibration module 606 is configured to apply twirling processes to a quantum system to determine channel parameters in pulse sequences input to the twirling operations. A noise characterization module 608 is configured to receive the errors and the channel parameters from the error calibration module 604 and the channel parameter calibration module 606 to characterize the noise characteristics to determine if the noise is independent relaxation of qubits or collective relaxation of qubits. The system 600 performs operations as set forth above.

Having described preferred embodiments of a system and method for quantum computer calibration and performance estimation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for characterizing noise in a quantum system, comprising:
   determining pulse sequences for unitary twirling operations;
   applying twirling processes to a quantum system to calibrate errors;
   applying twirling processes to the quantum system to determine channel parameters;
   determining noise characteristics from calibration data collected to calibrate the errors and from the determined channel parameters; and
   characterizing the noise characteristics to determine if the noise is independent relaxation of qubits or collective relaxation of qubits.

2. The method as recited in claim 1, wherein determining pulse sequences for unitary twirling operations includes determining pulse sequences for unitary twirling operations based upon one of microwave pulses for superconducting qubits and radio frequency pulses for nuclear magnetic resonance qubits.

3. The method as recited in claim 1, wherein applying twirling processes to a quantum system to determine channel parameters includes:
   choosing random operations from a set of twirling operations;
   applying the random operations;
   performing a process to be characterized; and
   applying an inverse of the random operations to determine the channel parameters for a quantum operation.

4. The method as recited in claim 1, wherein applying twirling processes to a quantum system to calibrate errors includes:
   choosing random operations from a set of twirling operations;
   applying the random operations; and
   applying an inverse of the random operations to yield calibration data for a quantum operation.

5. The method as recited in claim 1, wherein determining noise characteristics includes estimating channel eigenvalues which are employed to compute probabilities of error in qubits of the quantum system.

6. The method as recited in claim 5, wherein the probabilities of error are computed using linear relationships as a function of the eigenvalues.

7. The method as recited in claim 1, wherein characterizing the noise characteristics includes determining an amount of violation of an eigenvalue relationship rule to determine if the noise is independent relaxation of qubits or collective relaxation of qubits.

8. The method as recited in claim 1, wherein characterizing the noise characteristics includes comparing a waiting time against a relaxation time to determine if the noise is independent relaxation of qubits or collective relaxation of qubits.

9. A method for characterizing noise in a quantum system, comprising:
   determining pulse sequences for unitary twirling operations;
   applying twirling processes to a quantum system to calibrate errors;
   iterating the previous steps until a first confidence level is reached for error calibration;
   applying twirling processes to the quantum system to determine channel parameters;
   iterating the previous steps until a second confidence level is reached for channel parameters;
   determining noise characteristics from calibration data collected to calibrate the errors and from the determined channel parameters; and
   characterizing the noise characteristics to determine if the noise is independent relaxation of qubits or collective relaxation of qubits.

10. The method as recited in claim 9, wherein determining pulse sequences for unitary twirling operations includes determining pulse sequences for unitary twirling operations based upon one of microwave pulses for superconducting qubits and radio frequency pulses for nuclear magnetic resonance qubits.

11. The method as recited in claim 9, wherein applying twirling processes to a quantum system to determine channel parameters includes:
    choosing random operations from a set of twirling operations;
    applying the random operations;
    performing a process to be characterized; and
    applying an inverse of the random operations to determine the channel parameters for a quantum operation.

12. The method as recited in claim 9, wherein applying twirling processes to a quantum system to calibrate errors includes:
    choosing random operations from a set of twirling operations;
    applying the random operations; and
    applying an inverse of the random operations to yield calibration data for a quantum operation.

13. The method as recited in claim 9, wherein determining noise characteristics includes estimating channel eigenvalues which are employed to compute probabilities of error in qubits of the quantum system.

14. The method as recited in claim 13, wherein the probabilities of error are computed using linear relationships as a function of the eigenvalues.

15. The method as recited in claim 9, wherein characterizing the noise characteristics includes determining an amount of violation of an eigenvalue relationship rule to determine if the noise is independent relaxation of qubits or collective relaxation of qubits.

16. The method as recited in claim 9, wherein characterizing the noise characteristics includes comparing a waiting time against a relaxation time to determine if the noise is independent relaxation of qubits or collective relaxation of qubits.

17. A system for characterizing noise in a quantum system, comprising:
    an error calibration module configured to apply twirling processes to a quantum system to calibrate errors in pulse sequences input to the twirling operations;
    a channel parameter calibration module configured to apply twirling processes to a quantum system to determine channel parameters in pulse sequences input to the twirling operations; and
    a noise characterization module configured to receive the errors and the channel parameters from the error calibration module and the channel parameter calibration module to characterize the noise characteristics to determine if the noise is independent relaxation of qubits or collective relaxation of qubits.

18. The system as recited in claim 17, wherein the pulse sequences for unitary twirling operations are based upon one of microwave pulses for superconducting qubits and radio frequency pulses for nuclear magnetic resonance qubits.

19. The system as recited in claim 17, wherein the noise characteristics include estimated channel eigenvalues employed to compute probabilities of error in qubits of the quantum system.

20. The system as recited in claim 17, wherein an amount of violation of an eigenvalue relationship rule is employed to determine if the noise is independent relaxation of qubits or collective relaxation of qubits.

21. The method as recited in claim 17, wherein a waiting time is compared against a relaxation time to determine if the noise is independent relaxation of qubits or collective relaxation of qubits.

* * * * *